(12) United States Patent
Calder et al.

(10) Patent No.: US 8,220,738 B2
(45) Date of Patent: Jul. 17, 2012

(54) NACELLE AND METHOD OF ASSEMBLING THE SAME

(75) Inventors: David P. Calder, Baltimore, MD (US); Graham F. Howarth, Baltimore, MD (US)

(73) Assignee: MRA Systems, Inc., Stamford, CT (US)

( * ) Notice: Subject to any disclaimer, the term of this patent is extended or adjusted under 35 U.S.C. 154(b) by 789 days.

(21) Appl. No.: 12/324,429

(22) Filed: Nov. 26, 2008

(65) Prior Publication Data
US 2010/0127116 A1 May 27, 2010

(51) Int. Cl.
B64D 29/00 (2006.01)
B64D 29/06 (2006.01)

(52) U.S. Cl. ............... 244/53 R; 244/110 B; 244/54
(58) Field of Classification Search ............ 244/54, 244/129.4, 129.5, 110 B
See application file for complete search history.

(56) References Cited

U.S. PATENT DOCUMENTS

| | | | | |
|---|---|---|---|---|
| 4,005,822 A * | 2/1977 | Timms | ............ | 244/110 B |
| 4,047,682 A * | 9/1977 | Brownhill | ............ | 244/110 B |
| 4,825,648 A | 5/1989 | Adamson | | |
| 5,228,641 A * | 7/1993 | Remlaoui | ............ | 244/110 B |
| 5,448,884 A * | 9/1995 | Repp | ............ | 60/226.2 |
| 6,129,311 A | 10/2000 | Welch et al. | | |
| 6,220,546 B1 | 4/2001 | Klamka et al. | | |
| 6,334,588 B1 | 1/2002 | Porte | | |
| 6,334,730 B1 | 1/2002 | Porte | | |
| 6,622,963 B1 | 9/2003 | Ahrendt et al. | | |
| 6,625,972 B1 * | 9/2003 | Sternberger | ............ | 244/110 B |
| 6,935,097 B2 * | 8/2005 | Eschborn | ............ | 244/110 B |
| 7,334,393 B2 | 2/2008 | Porte | | |
| 2006/0145001 A1 * | 7/2006 | Smith | ............ | 244/110 B |
| 2007/0278345 A1 | 12/2007 | Oberle et al. | | |
| 2008/0110153 A1 | 5/2008 | Seda et al. | | |
| 2008/0112801 A1 | 5/2008 | Moniz et al. | | |
| 2008/0112802 A1 | 5/2008 | Orlando et al. | | |
| 2010/0001123 A1 | 1/2010 | Hillereau et al. | | |
| 2010/0064659 A1 * | 3/2010 | Wang | ............ | 60/226.2 |
| 2010/0229527 A1 * | 9/2010 | Amkraut et al. | ............ | 60/226.2 |
| 2010/0229528 A1 * | 9/2010 | Ramlaoui et al. | ............ | 60/226.2 |
| 2011/0296813 A1 * | 12/2011 | Frank et al. | ............ | 60/230 |

OTHER PUBLICATIONS

PCT International Search Report for Application No. PCT/US2009/061118 dated Jan. 25, 2010.

* cited by examiner

*Primary Examiner* — Tien Dinh
*Assistant Examiner* — Steven Hawk
(74) *Attorney, Agent, or Firm* — David J. Clement, Esq.; Armstrong Teasdale, LLP

(57) ABSTRACT

A method of assembling a nacelle for a gas turbine engine that includes an inlet end, an exhaust end, and an axis that extends through the engine from the inlet end through the exhaust end is provided. The method includes providing a cowl sized to cover at least a portion of the engine and coupling the cowl to the engine such that the cowl is slideable along the axis toward at least one of the inlet end and the exhaust end.

20 Claims, 8 Drawing Sheets

NACELLE AND METHOD OF ASSEMBLING THE SAME

BACKGROUND OF THE INVENTION

The field of this disclosure relates generally to nacelles and, more particularly, to a nacelle and a method of assembling the same.

Many known gas turbine engine assemblies include a nacelle that houses an engine. At least some known nacelles include a cowl that has hinged sections that can be propped open using support rods to permit engine maintenance. However, when propped open, the cowl sections may be subjected to significant wind gusts, requiring the cowl sections and the support rods to be sized larger in order to withstand the wind gusts when the cowl is in the open position. However, larger cowl sections and larger hold-open components increase the overall weight of the engine assembly, thereby decreasing the fuel efficiency of the engine and increasing the costs associated with operating the engine.

As such, a nacelle that enables a cowl to remain open while reducing wind loads on the cowl would facilitate decreasing the overall weight of the cowl and associated hold-open components, thereby increasing engine efficiency by reducing fuel consumption.

BRIEF DESCRIPTION OF THE INVENTION

In one aspect, a method of assembling a nacelle for a gas turbine engine that includes an inlet end, an exhaust end, and an axis that extends through the engine from the inlet end through the exhaust end is provided. The method includes providing a cowl sized to cover at least a portion of the engine and coupling the cowl to the engine such that the cowl is slideable along the axis toward at least one of the inlet end and the exhaust end.

In another aspect, a nacelle for housing an engine that includes an inlet end, an exhaust end, and an axis extending through the engine from the inlet end through the exhaust end is provided. The nacelle includes a cowl sized to cover at least a portion of the engine, the cowl configured to be coupled to the engine such that the cowl is slideable along the axis toward at least one of the inlet end and the exhaust end.

DETAILED DESCRIPTION OF THE INVENTION

The following detailed description illustrates a nacelle and a method of assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, a nacelle and a method of assembling the same. However, it is contemplated that this disclosure has general application to cowls in a broad range of systems and in a variety of industrial and/or consumer applications.

Figure 1:
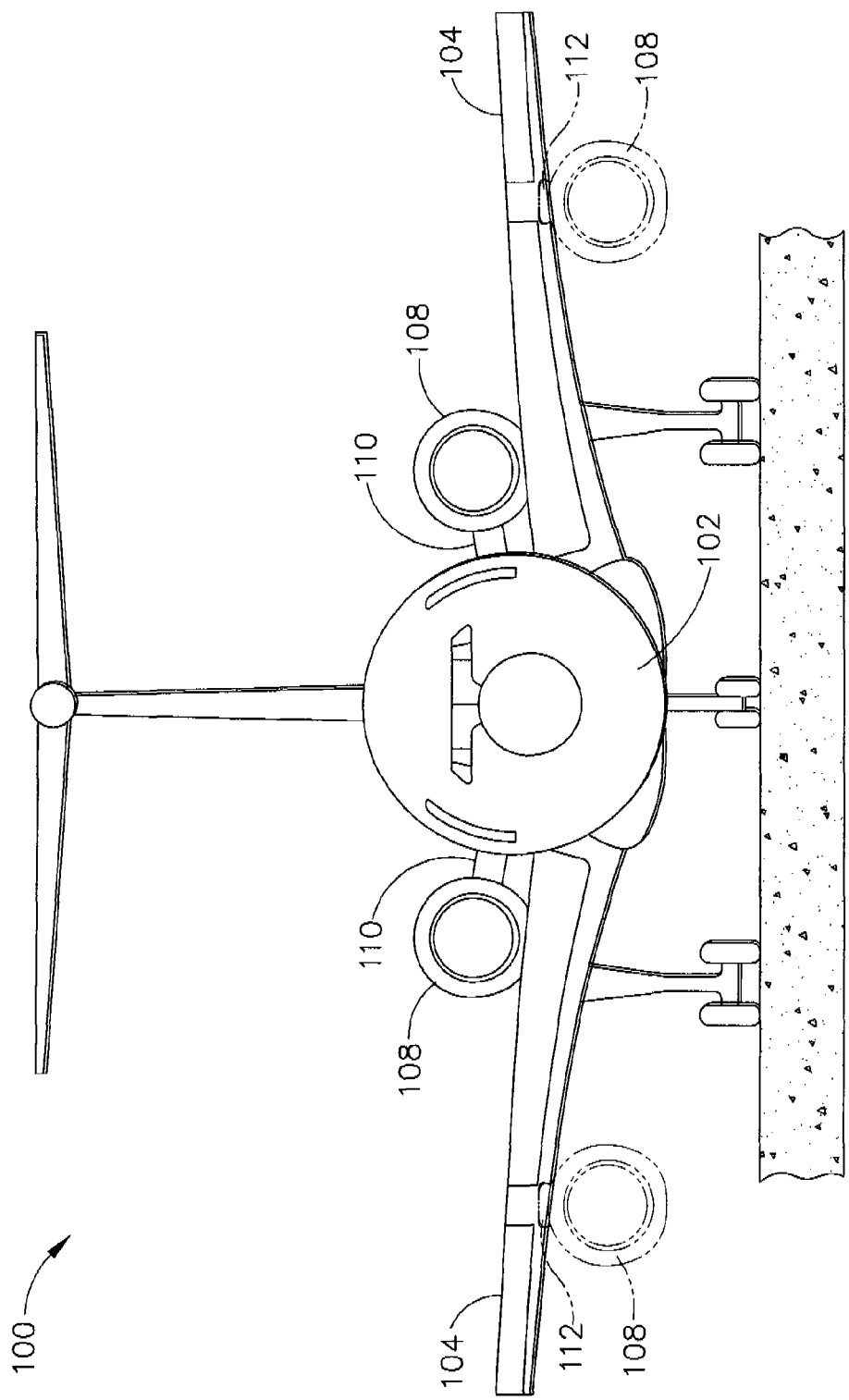
FIG. 1 is a schematic illustration of an aircraft.

FIG. 1 is a schematic illustration of an aircraft 100 including a fuselage 102 and a pair of wings 104. In one embodiment, aircraft 100 includes a pair of engine assemblies 108 coupled to fuselage 102 via a pair of fuselage pylons 110. In another embodiment, engine assemblies 108 may be suspended from wings 104 via a pair of wing pylons 112. Fuselage pylons 110 and wing pylons 112 may be coupled to fuselage 102 and wings 104, respectively, using any suitable coupling arrangement (e.g., a bolted arrangement).

Figure 2:
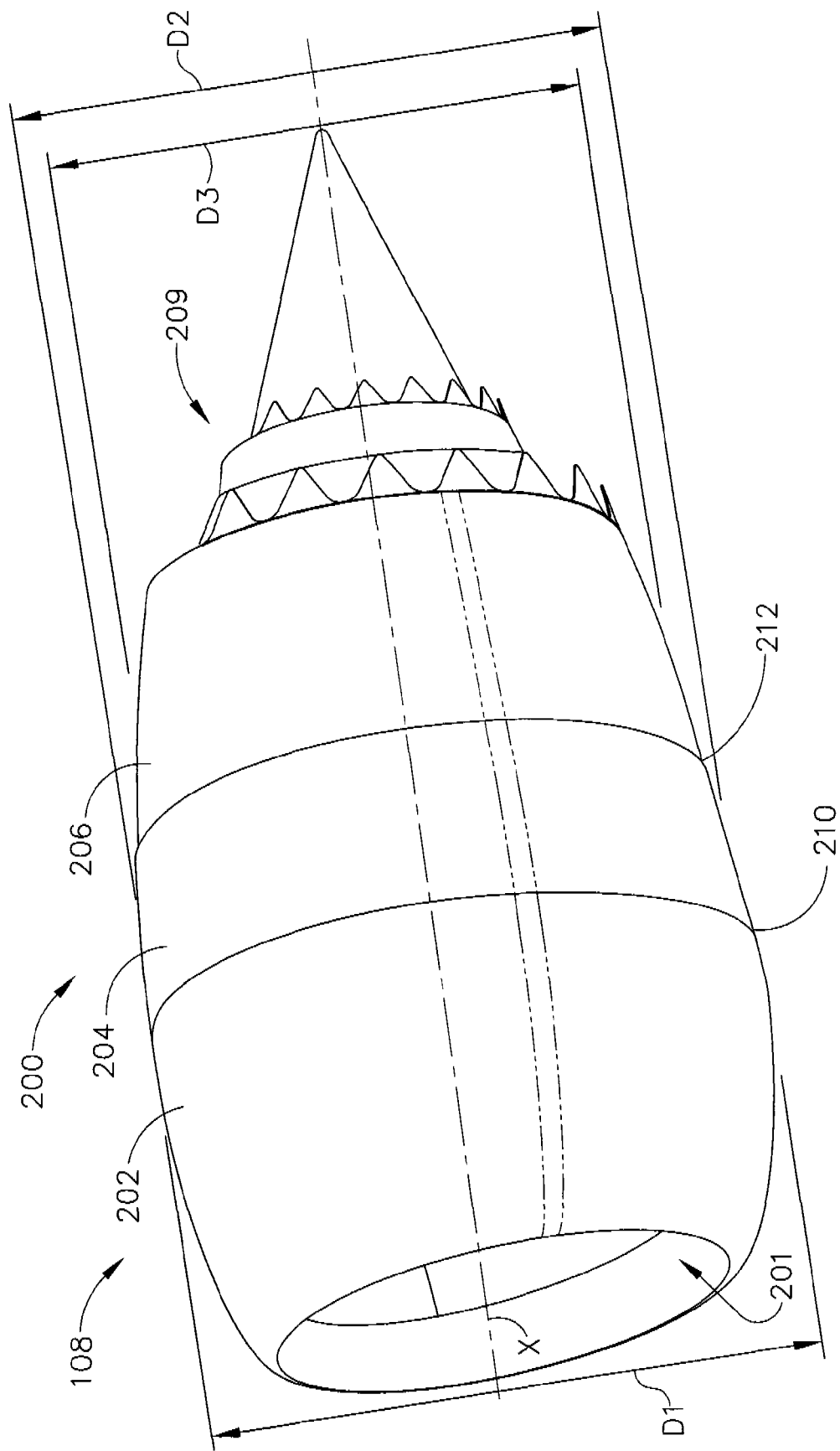
FIG. 2 is a perspective view of a gas turbine engine assembly for use on the aircraft shown in FIG. 1.

FIG. 2 is a perspective view of engine assembly 108. In the exemplary embodiment, engine assembly 108 includes a generally annular nacelle 200 that is coupled about a gas turbine engine. Nacelle 200 includes an inlet 202, a fan cowl 204, and a translating cowl 206 (hereinafter referred to as a "transcowl"). Inlet 202 circumscribes an inlet end 201 of the engine, and translating cowl 206 circumscribes an exhaust end 209 of the engine, such that an axis X extends through a center of the engine from inlet end 201 through exhaust end 209. Inlet 202 has a diameter $D_1$ that is larger than a diameter $D_2$ of fan cowl 204, and diameter $D_2$ of fan cowl 204 is larger than a diameter $D_3$ of transcowl 206. Fan cowl 204 covers a portion of the engine such that a first end 210 of fan cowl 204 abuts inlet 202 and such that a second end 212 of fan cowl 204 overlaps a portion of transcowl 206. Alternatively, inlet 202, fan cowl 204, and/or transcowl 206 may have any suitable diameters and may be positioned relative to one another in any suitable manner that enables nacelle 200 to function as described herein. As used herein, the term "fan cowl" refers to a cowl for use in covering any portion of an engine and is not limited to a cowl for use in covering a fan.

Figure 3:
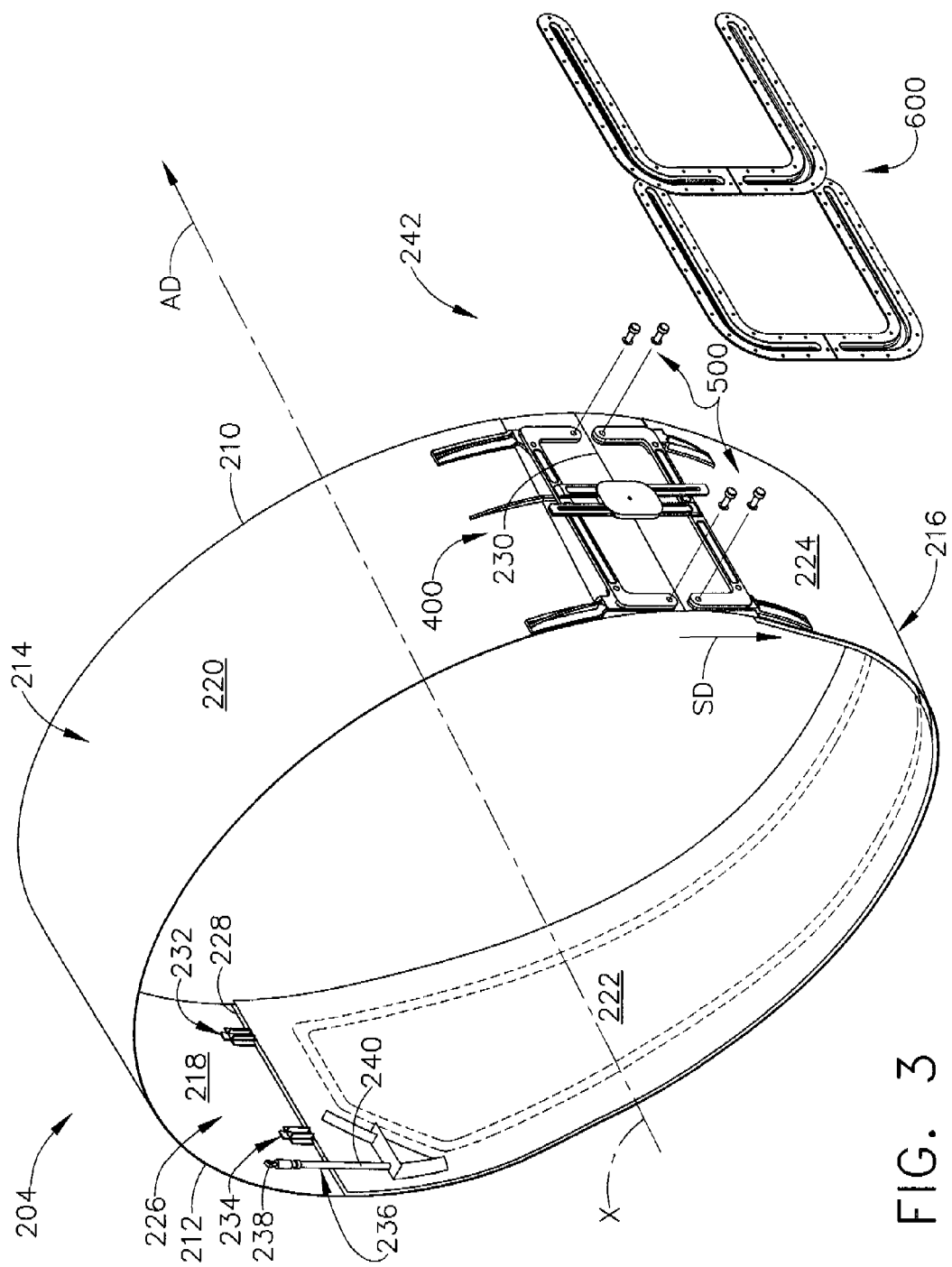
FIG. 3 is an exploded view of a mounting assembly for use in coupling the engine assembly shown in FIG. 2 to the fuselage of the aircraft shown in FIG. 1.

FIG. 3 is an exploded view of an exemplary mounting assembly 242 for use in coupling fan cowl 204 to fuselage pylon 110 (shown in FIG. 1). In the exemplary embodiment, fan cowl 204 includes a first half 214 and a second half 216. First half 214 includes an inner surface 218 and an outer surface 220, and second half 216 includes an inner surface 222 and an outer surface 224. A locking assembly 226 joins first half 214 to second half 216 at a first joint 228, and mounting assembly 242 joins first half 214 to second half 216 at a second joint 230. Mounting assembly 242 includes a connection mechanism 400 slideably coupled within a track arrangement 600 via a guide arrangement 500.

Locking assembly 226 includes a first latch 232, a second latch 234, and a limit stop 236. First latch 232 and second latch 234 are exposed on first half outer surface 220 and/or second half outer surface 224 such that first latch 232 and/or second latch 234 are openable by a user when first half 214 is coupled to second half 216. In the exemplary embodiment, limit stop 236 is an expandable rod (e.g., a telescopic rod) that includes a first end 238 coupled to first half inner surface 218 and a second end 240 coupled to second half inner surface 222 such that limit stop 236 spans first joint 228. Alternatively, limit stop 236 may be any suitable stop mechanism that enables locking assembly 226 to function as described herein.

Figure 4:
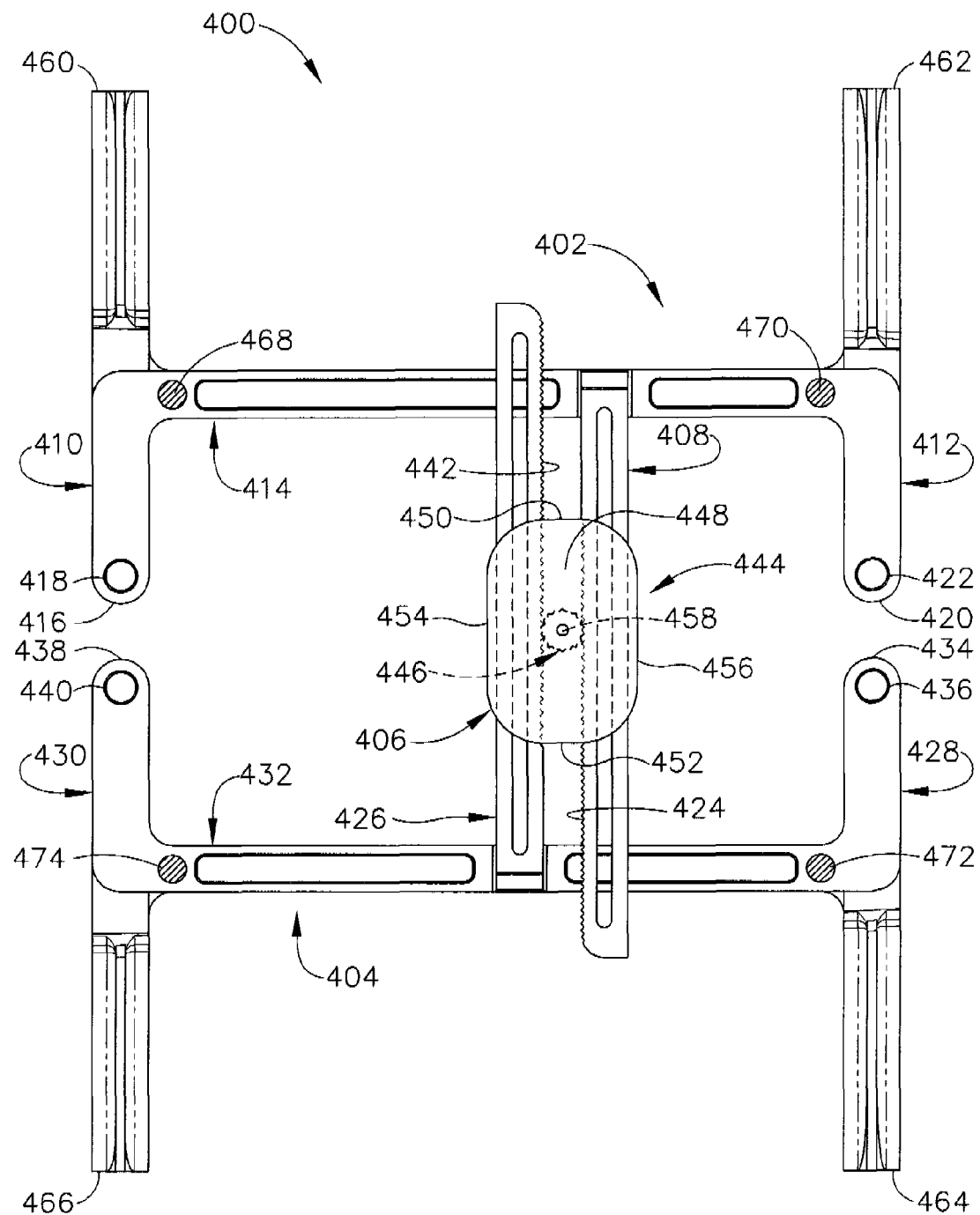
FIG. 4 is an enlarged side elevation view of a connection mechanism for use in the mounting assembly shown in FIG. 3.

FIG. 4 is an enlarged side elevation view of connection mechanism 400. Connection mechanism 400 includes a first connection member 402, a second connection member 404, a rate control device 406, a first mounting bracket 460, a second mounting bracket 462, a third mounting bracket 464, and a fourth mounting bracket 466.

First connection member 402 includes a first drive arm 408, a first guide arm 410, a second guide arm 412, and a first support arm 414. First guide arm 410 is formed with and extends substantially perpendicularly from first support arm 414 to a first end 416 that defines a first guide slot 418. Second guide arm 412 is formed with and extends substantially perpendicularly from first support arm 414 to a second end 420 that defines a second guide slot 422. First drive arm 408 is formed with and extends substantially perpendicularly from first support arm 414 between first guide arm 410 and second guide arm 412, and first drive arm 408 defines a first rack gear 424. First connection member 402 is coupled to first mounting bracket 460 via a first fastener 468 (e.g., a bolt) and to second mounting bracket 462 via a second fastener 470 (e.g., a bolt). In one embodiment, first fastener 468 and second fastener 470 also couple first mounting bracket 460 and second mounting bracket 462, respectively, to fan cowl first half 214 (shown in FIG. 3). Alternatively, mounting brackets 460, 462 may be coupled to fan cowl first half 214 using any suitable fasteners that enable mounting assembly 242 to function as described herein.

Second connection member 404 includes a second drive arm 426, a third guide arm 428, a fourth guide arm 430, and a second support arm 432. Third guide arm 428 is formed with and extends substantially perpendicularly from second support arm 432 to a third end 434 that defines a third guide slot 436. Fourth guide arm 430 is formed with and extends substantially perpendicularly from second support arm 432 to a fourth end 438 that defines a fourth guide slot 440. Second drive arm 426 is formed with and extends substantially perpendicularly from second support arm 432 between third guide arm 428 and fourth guide arm 430, and second drive arm 426 defines a second rack gear 442. Second connection member 404 is coupled to third mounting bracket 464 via a third fastener 472 (e.g., a bolt) and to fourth mounting bracket 466 via a fourth fastener 474 (e.g., a bolt). In one embodiment, third fastener 472 and fourth fastener 474 also couple third mounting bracket 464 and fourth mounting bracket 466, respectively, to fan cowl second half 216 (shown in FIG. 3). Alternatively, mounting brackets 464, 466 may be coupled to fan cowl second half 216 using any suitable fasteners that enable mounting assembly 242 to function as described herein.

Rate control device 406 includes a sleeve 444 and a drive gear 446. Sleeve 444 has an outer wall 448 that defines a first open end 450, a second open end 452, a first side 454, and a second side 456. Drive gear 446 is mounted centrally within sleeve 444 and rotatably about a shaft 458 that extends through outer wall 448. In one embodiment, shaft 458 applies a counter-rotational force against drive gear 446 (e.g., via a frictional engagement with drive gear 446) to facilitate controlling a rotational speed of drive gear 446. In other embodiments, drive gear 446 may be mounted within sleeve 444 using any suitable mounting mechanism that enables rate control device 406 to function as described herein. First drive arm 408 extends through sleeve 444 from first open end 450 through second open end 452, and second drive arm 426 extends through sleeve 444 from second open end 452 through first open end 450. First side 454 and second side 456 facilitate aligning first drive arm 408 and second drive arm 426 such that first rack gear 424 and second rack gear 442 maintain a driving engagement with drive gear 446. In one embodiment, limit stop 236 and/or drive gear 446 may be powered (e.g., by a motor) to facilitate moving first half 214 and/or second half 216 relative to one another, as described herein. In other embodiments, engine assembly 108 may utilize any suitable drive mechanisms (e.g., hydraulic devices, pneumatic devices, electro-hydraulic devices, electro-pneumatic devices, linear motor arrangements, etc.) located anywhere on aircraft 100 and/or remotely from aircraft 100 to facilitate adjusting fan cowl 204 as described herein.

Figure 5:
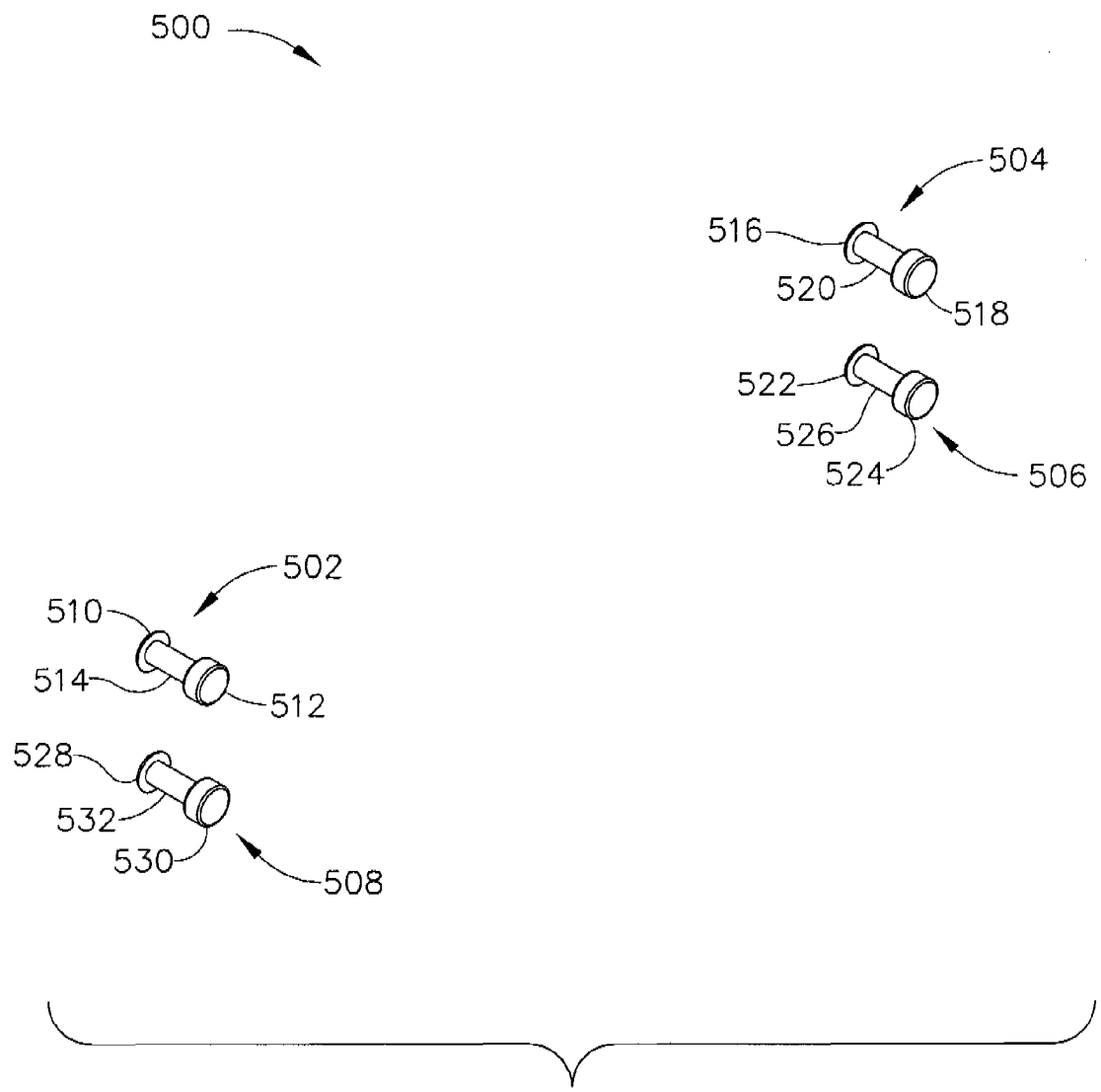
FIG. 5 is an enlarged perspective view of a guide arrangement for use in the mounting assembly shown in FIG. 3.

FIG. 5 is an enlarged perspective view of an exemplary guide arrangement 500. In the exemplary embodiment, guide arrangement 500 includes a first guide 502, a second guide 504, a third guide 506, and a fourth guide 508. First guide 502 includes a first base 510, a first head 512, and a first neck 514 extending between first base 510 and first head 512. Second guide 504 includes a second base 516, a second head 518, and a second neck 520 extending between second base 516 and second head 518. Third guide 506 includes a third base 522, a third head 524, and a third neck 526 extending between third base 522 and third head 524. Fourth guide 508 includes a fourth base 528, a fourth head 530, and a fourth neck 532 extending between fourth base 528 and fourth head 530. Alternatively, guide arrangement 500 may include any number of guides having any suitable shape that enables mounting assembly 242 to function as described herein.

Figure 6:
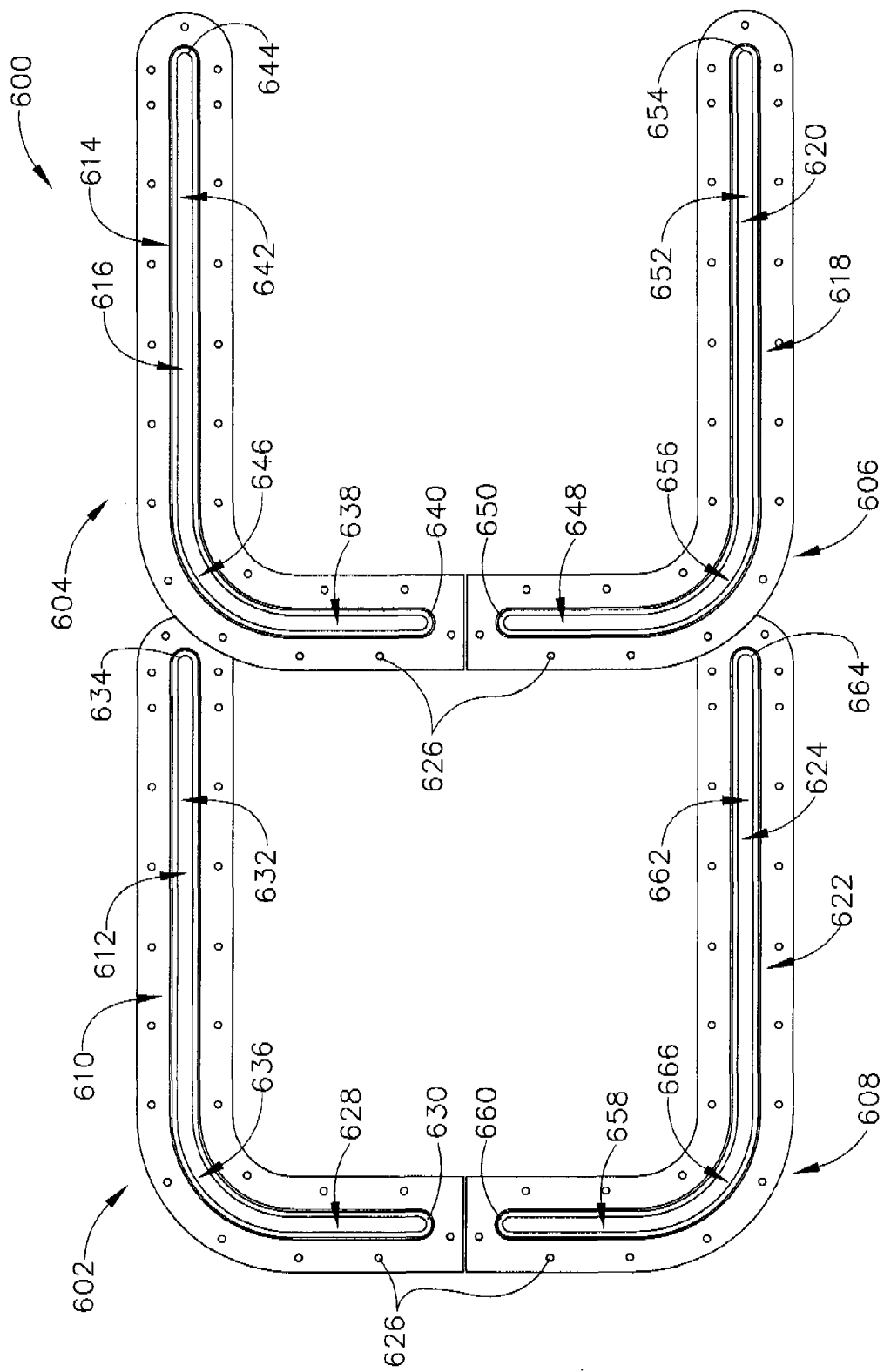
FIG. 6 is an enlarged side elevation view of a track arrangement for use in the mounting assembly shown in FIG. 3.

FIG. 6 is an enlarged side elevation view of an exemplary track arrangement 600. In the exemplary embodiment, track arrangement 600 includes a first track 602, a second track 604, a third track 606, and a fourth track 608. First track 602 defines a first channel 610 having a first slit 612, and second track 604 defines a second channel 614 having a second slit 616. Third track 606 defines a third channel 618 having a third slit 620, and fourth track 608 defines a fourth channel 622 having a fourth slit 624. Each track 602, 604, 606, 608 includes a plurality of fastener holes 626 to facilitate coupling track arrangement 600 to fuselage pylon 110. First slit 612 has a first aftward portion 628 defining a first aftward end 630, a first forward portion 632 defining a first forward end 634, and a first bend 636 extending between first aftward portion 628 and first forward portion 632. Second slit 616 has a second aftward portion 638 defining a second aftward end 640, a second forward portion 642 defining a second forward end 644, and a second bend 646 extending between second aftward portion 638 and second forward portion 642. Third slit 620 has a third aftward portion 648 defining a third aftward end 650, a third forward portion 652 defining a third forward end 654, and a third bend 656 extending between third aftward portion 648 and third forward portion 652. Fourth slit 624 has a fourth aftward portion 658 defining a fourth aftward end 660, a fourth forward portion 662 defining a fourth forward end 664, and a fourth bend 666 extending between fourth aftward portion 658 and fourth forward portion 662. In the exemplary embodiment, track arrangement 600 is oriented such that first forward portion 632 is aligned with second forward portion 642 and such that third forward portion 652 is aligned with fourth forward portion 662. Alternatively, track arrangement 600 may have any orientation that enables mounting assembly 242 to function as described herein.

In operation, first track 602 is coupled to first connection member 402 via first guide 502 such that first head 512 is positioned within first channel 610, first neck 514 extends through first slit 612 and first guide slot 418, and first base 510 is positioned between first connection member 402 and fan cowl 204. Second track 604 is coupled to first connection member 402 via second guide 504 such that second head 518 is positioned within second channel 614, second neck 520 extends through second slit 616 and second guide slot 422, and second base 516 is positioned between first connection member 402 and fan cowl 204. Third track 606 is coupled to second connection member 404 via third guide 506 such that third head 524 is positioned within third channel 618, third neck 526 extends through third slit 620 and third guide slot 436, and third base 522 is positioned between second connection member 404 and fan cowl 204. Fourth track 608 is coupled to second connection member 404 via fourth guide 508 such that fourth head 530 is positioned within fourth channel 622, fourth neck 532 extends through fourth slit 624 and fourth guide slot 440, and fourth base 528 is positioned between second connection member 404 and fan cowl 204. With first head 512, second head 518, third head 524, and fourth head 530 positioned within first channel 610, second channel 614, third channel 618, and fourth channel 622, respectively, nacelle 200 is mounted on fuselage 102 by coupling track arrangement 600 to fuselage pylon 110 using any suitable fasteners (e.g., bolts) that extend through fastener holes 626 and engage fuselage pylon 110. When fan cowl 204 is closed (i.e., when fan cowl first half 214 and fan cowl second half 216 are fastened together via first latch 232 and/or second latch 234), first guide 502 is seated adjacent first aftward end 630, second guide 504 is seated adjacent second aftward end 640, third guide 506 is seated adjacent third aftward end 650, and fourth guide 508 is seated adjacent fourth aftward end 660.

To open fan cowl 204, a user may unlock first latch 232 and/or second latch 234. When first latch 232 and/or second latch 234 is unlocked, a force may be applied to fan cowl second half 216 in a separating direction SD (shown in FIG. 3) (e.g., a manual force applied by a user, a gravitational force, and/or a force applied by a motor located on or remotely from aircraft 100) to facilitate moving fan cowl second half 216 away from axis X. As fan cowl second half 216 moves away from axis X, second drive arm 426 drives drive gear 446 into rotation via second rack gear 442 such that the rotation of drive gear 446 drives fan cowl first half 214 away from axis X via first rack gear 424. In one embodiment, shaft 458 controls (i.e., slows) the rotation of drive gear 446 such that fan cowl second half 216 and fan cowl first half 214 move away from axis X (i.e., move away from one another) at a predetermined rate.

As fan cowl second half 216 and fan cowl first half 214 move away from axis X, first guide 502, second guide 504, third guide 506, and fourth guide 508 move along first channel 610, second channel 614, third channel 618, and fourth channel 622, respectively. Specifically, first guide 502, second guide 504, third guide 506, and fourth guide 508 move simultaneously in the following manner: first guide 502 moves from first aftward end 630, along first aftward portion 628, and partially across first bend 636; second guide 504 moves from second aftward end 640, along second aftward portion 638, and partially across second bend 646; third guide 506 moves from third aftward end 650, along third aftward portion 648, and partially across third bend 656; and fourth guide 508 moves from fourth aftward end 660, along fourth aftward portion 658, and partially across fourth bend 666, such that fan cowl first half 214 and fan cowl second half 216 move away from axis X toward a predetermined maximum distance of separation, as controlled by limit stop 236.

When fan cowl first half 214 and fan cowl second half 216 have moved away from one another a distance, fan cowl first half 214 and fan cowl second half 216 begin to move over inlet 202 and toward inlet end 201. Specifically, first guide 502, second guide 504, third guide 506, and fourth guide 508 move simultaneously in the following manner: first guide 502 moves completely across first bend 636, along first forward portion 632, and into engagement with first forward end 634; second guide 504 moves completely across second bend 646, along second forward portion 642, and into engagement with second forward end 644; third guide 506 moves completely across third bend 656, along third forward portion 652, and into engagement with third forward end 654; and fourth guide 508 moves completely across fourth bend 666, along fourth forward portion 662, and into engagement with fourth forward end 664. When first guide 502, second guide 504, third guide 506, and/or fourth guide 508 engage first forward end 634, second forward end 644, third forward end 654, and fourth forward end 664, respectively, fan cowl first half 214 and fan cowl second half 216 stop moving toward inlet end 201, and fan cowl 204 remains in an open position such that a portion of the engine is accessible to a user (e.g., to maintenance the engine).

To close fan cowl 204, a force may be applied to either fan cowl first half 214 and/or fan cowl second half 216 in an axial direction AD (shown in FIG. 3) (e.g., a manual force applied by a user and/or a force applied by a motor located on or remotely from aircraft 100) such that fan cowl first half 214 and fan cowl second half 216 move toward exhaust end 209. Specifically, first guide 502, second guide 504, third guide 506, and fourth guide 508 simultaneously move in the following manner: first guide 502 moves along first channel 610 from first forward end 634 toward first aftward end 630; second guide 504 moves along second channel 614 from second forward end 644 toward second aftward end 640; third guide 506 moves along third channel 618 from third forward end 654 toward third aftward end 650; and fourth guide 508 moves along fourth channel 622 from fourth forward end 664 toward fourth aftward end 660. When first guide 502, second guide 504, third guide 506, and fourth guide 508 are adjacent first aftward end 630, second aftward end 640, third aftward end 650, and fourth aftward end 660, respectively, fan cowl first half 214 and fan cowl second half 216 engage one another at first joint 228 and second joint 230 (i.e., fan cowl 204 closes). Once fan cowl 204 is closed, a user may lock first latch 232 and/or second latch 234 to fasten fan cowl first half 214 to fan cowl second half 216 to facilitate restricting access to the engine through fan cowl 204.

In one embodiment, a system controller located on aircraft 100 and/or remotely from aircraft 100 may facilitate adjusting fan cowl 204 as described herein. In the exemplary embodiment, the system controller may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. As used herein, the term "processor" is not limited to only integrated circuits referred to in the art as a processor, but broadly refers to a computer, a microcontroller, a microcomputer, a programmable logic controller, an application specific integrated circuit and any other programmable circuit. Moreover, the system controller may be a microprocessor that includes read-only memory (ROM) and/or random access memory (RAM), such as, for example, a 32 bit microcomputer with 2 Mbit ROM, and 64 Kbit RAM. In the exemplary embodiment, the system controller communicates with (i.e., receives signals from and/or transmits signals to) a memory, a plurality of sensors, and/or a variety of other devices (e.g., motors for driving fan cowl first half 214 and second half 216 relative to one another) located on aircraft 100 (e.g., an onboard computer) and/or remotely from aircraft 100 to facilitate adjusting fan cowl 204 as described herein.

Figure 7:
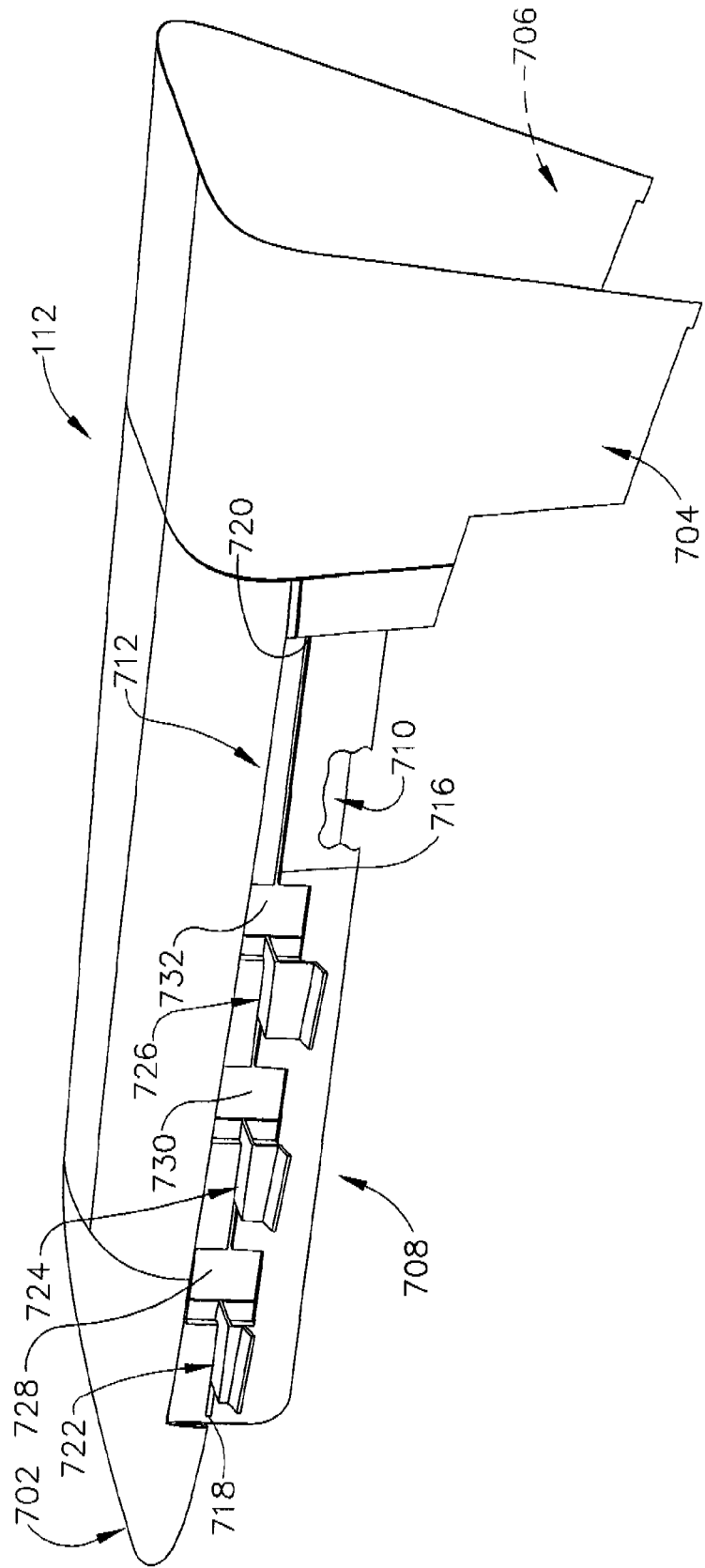
FIG. 7 is an enlarged perspective view of a pylon for use in coupling the engine assembly shown in FIG. 2 to a wing of the aircraft shown in FIG. 1.

FIG. 7 is an enlarged perspective view of an exemplary wing pylon 112. In the exemplary embodiment, wing pylon 112 includes a nose fairing 702, a first side 704, and a second side 706. First side 704 includes a first track assembly 708, and second side 706 includes a second track assembly 710. First track assembly 708 and second track assembly 710 are substantially alike and may be formed integrally with and/or coupled to (e.g., bolted to) any suitable portion of wing pylon 112 that enables track assemblies 708, 710 to function as described herein. First track assembly 708 includes a fan cowl track 712 that extends substantially parallel to axis X when engine assembly 108 is coupled to wing pylon 112. Fan cowl track 712 includes a t-shaped slot 716 that extends from a forward end 718 to an aftward end 720. In other embodiments, slot 716 may have any suitable shape that enables fan cowl track 712 to function as described herein. A first bracket 722, a second bracket 724, and a third bracket 726 are positioned within and are slideable along slot 716. In the exemplary embodiment, brackets 722, 724, 726 are t-shaped to facilitate retaining brackets 722, 724, 726 within slot 716. Alternatively, brackets 722, 724, 726 may have any suitable shape that enables wing pylon 112 to function as described herein. A first cutout 728, a second cutout 730, and a third cutout 732 are defined within slot 716 to facilitate removing first bracket 722, second bracket 724, and third bracket 726, respectively, from slot 716.

Figure 8:
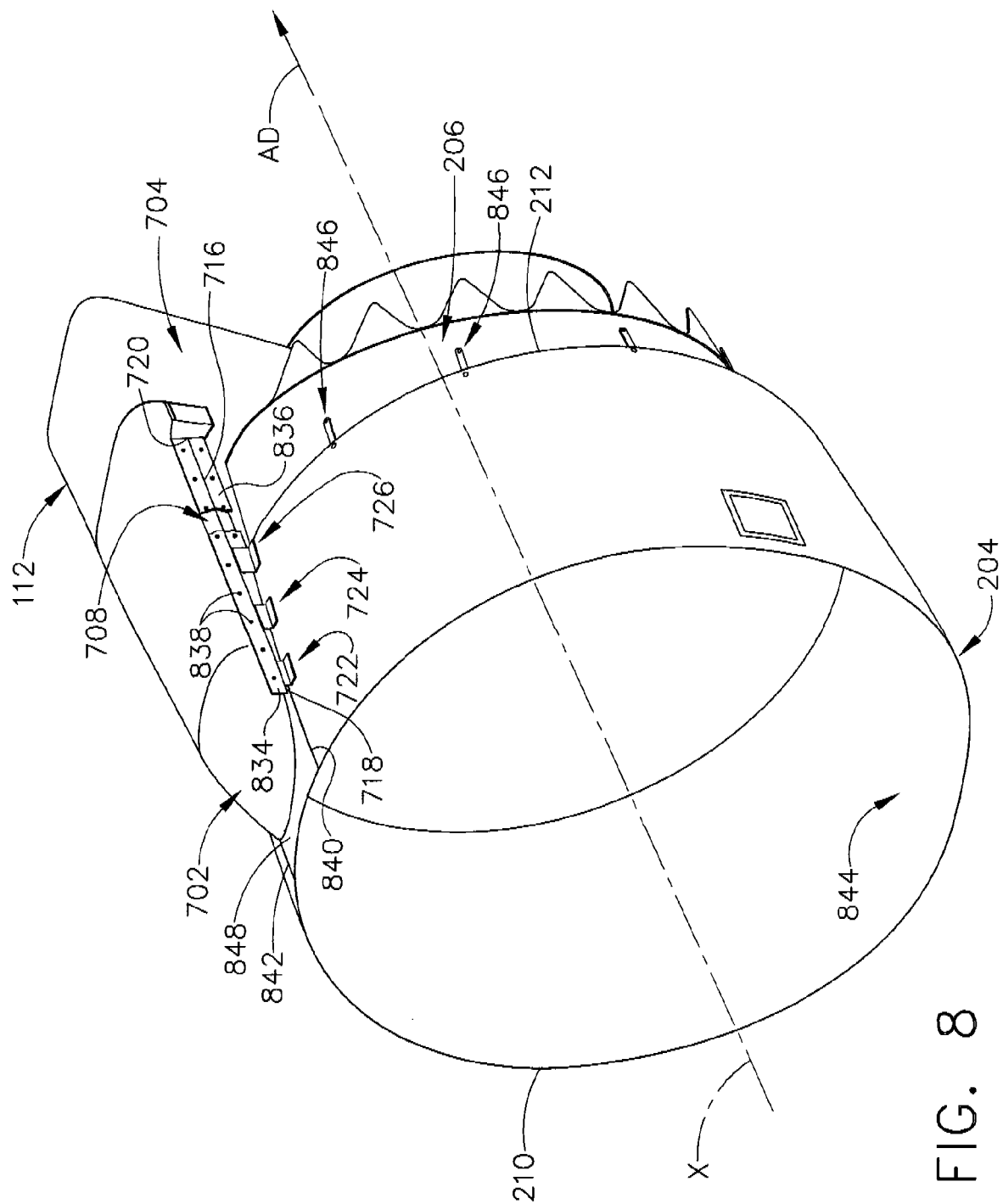
FIG. 8 is a perspective view of a portion of the engine assembly shown in FIG. 2 coupled to the pylon shown in FIG. 7.

FIG. 8 is a perspective view of an exemplary fan cowl 204 and transcowl 206 coupled to wing pylon 112. In the exemplary embodiment, an upper cover plate 834 and a lower cover plate 836 are removably coupled (e.g., via a plurality of bolts 838) to wing pylon 112 to substantially cover cutouts 728, 730, 732 (shown in FIG. 7) to facilitate retaining brackets 722, 724, 726 within slot 716. Cover plates 834, 836 are spaced apart from one another to facilitate enabling brackets 722, 724, 726 to slide along slot 716.

In the exemplary embodiment, fan cowl 204 includes a first edge 840, a second edge 842, and an arcuate body 844 extending from first edge 840 to second edge 842 such that first edge 840 and second edge 842 are spaced apart from one another. First edge 840 is coupled to first side 704 of wing pylon 112 via first track assembly 708, and second edge 842 is coupled to second side 706 (shown in FIG. 7) of wing pylon 112 via second track assembly 710 (shown in FIG. 7). In the exemplary embodiment, first edge 840 is coupled to first side 704 in the same manner as second edge 842 is coupled to second side 706. With respect to coupling first edge 840 to first side 704, first bracket 722, second bracket 724, and third bracket 726 are coupled to fan cowl 204 proximate first edge 840 such that fan cowl 204 is slideable along slot 716 in axial direction AD and toward exhaust end 209 (shown in FIG. 2). In one embodiment, transcowl 206 is also slideable toward exhaust end 209 such that fan cowl 204 and transcowl 206 are independently slideable relative to one another and/or relative to wing pylon 112. In another embodiment, fan cowl 204 and transcowl 206 are coupled together at fan cowl second end 212 via a plurality of tabs 846 such that fan cowl 204 is movable together with transcowl 206. In the exemplary embodiment, an apron 848 extends from nose fairing 702 into alignment with fan cowl first end 210 between first edge 840 and second edge 842 to facilitate covering an opening defined between nose fairing 702, inlet 202 (shown in FIG. 2), first edge 840, and second edge 842.

In the exemplary embodiment, a first track fairing (not shown) is coupled between fan cowl 204 and first side 704 and is positioned over first track assembly 708 to facilitate reducing wind drag on first track assembly 708. In one embodiment, the first track fairing is fastened to fan cowl 204 using any suitable fastener (e.g., a plurality of bolts) and in sliding engagement with wing pylon 112 such that the first track fairing is slideable with fan cowl 204 and against wing pylon 112. Alternatively, the first track fairing is fastened to wing pylon 112 using any suitable fastener (e.g., a plurality of bolts) and in sliding engagement with fan cowl 204 such that fan cowl 204 is slideable against the first track fairing. A second track fairing (not shown) is coupled between fan cowl 204 and second side 706 and is positioned over second track assembly 710 in the same manner as the first track fairing is positioned over first track assembly 708.

In operation, a force may be applied to fan cowl 204 (e.g., a manual force applied by a user and/or a force applied by a powered device, as described above) to move fan cowl 204 in axial direction AD, toward exhaust end 209, and over transcowl 206, such that fan cowl 204 slides toward aftward end 720 of slot 716 via brackets 722, 724, 726. In another embodiment, when fan cowl 204 is coupled to transcowl 206 via tabs 846, a force may be applied to transcowl 206 to move transcowl 206 toward exhaust end 209 such that transcowl 206 pulls fan cowl 204 along slot 716 and toward exhaust end 209. To remove fan cowl 204 from slot 716, a user may unfasten cover plates 834, 836 from wing pylon 112 and slide fan cowl 204 such that first bracket 722, second bracket 724, and third bracket 726 are aligned with first cutout 728, second cutout 730, and third cutout 732, respectively. Once first bracket 722, second bracket 724, and third bracket 726 are aligned with first cutout 728, second cutout 730, and third cutout 732, respectively, the user may pull first bracket 722 through first cutout 728, second bracket 724 through second cutout 730, and third bracket 726 through third cutout 732 to remove fan cowl 204 from slot 716.

As will be appreciated by one skilled in the art and based on the foregoing specification, the above-described embodiments of the invention may be implemented using computer programming or engineering techniques including computer software, firmware, hardware, or any combination or subset thereof, wherein one technical effect is to facilitate adjusting a cowl. Any resulting program, having computer-readable code means, may be embodied or provided within one or more computer-readable media, thereby making a computer program product, i.e., an article of manufacture, according to the discussed embodiments of the invention. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

The nacelle described herein enables a cowl to be adjusted in a manner that facilitates reducing wind loads on the cowl when the cowl is in an open position. The nacelle described herein further enables providing a cowl that has a reduced weight to facilitate decreasing an overall weight of the engine assembly and increasing engine efficiency by reducing fuel consumption of the engine.

Exemplary embodiments of a nacelle and a method of assembling the same are described above in detail. The nacelle is not limited to the specific embodiments described herein, but rather, components of the nacelle may be utilized independently and separately from other components described herein. For example, the cowl described herein may have other industrial and/or consumer applications and is not limited to practice with a nacelle for a gas turbine engine as described herein. Rather, the cowl can be implemented and utilized in connection with many other industries.

While the invention has been described in terms of various specific embodiments, those skilled in the art will recognize that the invention can be practiced with modification within the spirit and scope of the claims.

What is claimed is:

1. A method of assembling a nacelle for a gas turbine engine that includes an inlet end, an exhaust end, and an axis that extends through the engine from the inlet end through the exhaust end, said method comprising:
   providing a fan cowl sized to cover at least a first axial portion of the engine;
   extending the fan cowl about the first axial portion of the engine;
   extending a transcowl circumferentially about at least a second axial portion of the engine, the fan cowl extending from forward of the transcowl to an overlapping relationship with the transcowl; and
   coupling the fan cowl to an engine mounting pylon and the engine such that the fan cowl is movable with respect to the engine along the axis toward at least one of the inlet end and the exhaust end and the transcowl is movable with respect to the engine along the axis toward at least one of the inlet end and the exhaust end, wherein the fan cowl is independently slideable with respect to the transcowl along the axis toward at least one of the inlet end and the exhaust end.

2. A method in accordance with claim 1, further comprising:
   providing a track; and
   coupling the fan cowl to the track such that the fan cowl is slideable along the track.

3. A method in accordance with claim 1, wherein providing a fan cowl sized to cover at least a portion of the engine comprises providing an annular fan cowl that includes a first half and a second half, and wherein coupling the fan cowl to the engine comprises coupling the first half to the second half about the engine.

4. A method in accordance with claim 3, wherein coupling the first half to the second half about the engine comprises coupling the first half to the second half using at least one latch.

5. A method in accordance with claim 3, wherein coupling the first half to the second half about the engine comprises coupling a limit stop between the first half and the second half, the limit stop configured to control a distance that the first half and the second half are separable from one another.

6. A method in accordance with claim 3, wherein coupling the first half to the second half about the engine comprises:
   providing a mounting assembly; and
   coupling the mounting assembly between the first half and the second half, the mounting assembly configured to guide the first half and the second half away from the axis.

7. A method in accordance with claim 6, wherein providing a mounting assembly comprises providing a mounting assembly that includes a rate control device configured to control a rate at which the first half and the second half are moveable relative to one another.

8. A method in accordance with claim 1, wherein providing a fan cowl sized to cover at least a portion of the engine comprises providing an arcuate fan cowl.

9. A method in accordance with claim 1, wherein coupling the fan cowl to the engine comprises coupling the fan cowl and the transcowl to the engine such that the fan cowl overlaps the transcowl, the fan cowl slideable over the transcowl toward the exhaust end.

10. A method in accordance with claim 9, wherein coupling the fan cowl and the transcowl to the engine comprises coupling the fan cowl to the transcowl such that the fan cowl and the transcowl are moveable together.

11. A nacelle for housing an engine that includes an inlet end, an exhaust end, and an axis extending through the engine from the inlet end through the exhaust end, said nacelle comprising:
    a fan cowl sized to cover at least a first axial portion of the engine, said fan cowl coupled to an engine mounting pylon; and
    a transcowl circumscribing at least a second axial portion of the engine, said fan cowl extending from forward of said transcowl to an overlapping relationship with said transcowl, said fan cowl movable with respect to the engine along the axis toward at least one of the inlet end and the exhaust end, said transcowl movable with respect to the engine along the axis toward at least one of the inlet end and the exhaust end, said fan cowl independently slideable with respect to said transcowl along the axis toward at least one of the inlet end and the exhaust end.

12. A nacelle in accordance with claim 11, further comprising a track, wherein said fan cowl is coupled to said track such that said fan cowl is slideable along said track.

13. A nacelle in accordance with claim 11, wherein said fan cowl is annular, said fan cowl comprising a first half and a second half that are coupled together about the engine.

14. A nacelle in accordance with claim 13, further comprising at least one latch configured to couple said first half to said second half.

15. A nacelle in accordance with claim 13, further comprising a limit stop coupled between said first half and said second half, said limit stop configured to control a distance that said first half and said second half are separable from one another.

16. A nacelle in accordance with claim 13, further comprising a mounting assembly coupled between said first half and said second half, said mounting assembly configured to guide said first half and said second half away from the axis.

17. A nacelle in accordance with claim 16, wherein said mounting assembly comprises a rate control device configured to control a rate at which said first half and said second half are moveable relative to one another.

18. A nacelle in accordance with claim 11, wherein said fan cowl is arcuate.

19. A nacelle in accordance with claim 11, wherein said fan cowl and said transcowl are configured to be coupled to the engine such that said fan cowl overlaps said transcowl, said fan cowl slideable over said transcowl toward the exhaust end.

20. A nacelle in accordance with claim 19, wherein said fan cowl is coupled to said transcowl such that said fan cowl and said transcowl are moveable together.

* * * * *